United States Patent [19]
Guespin et al.

[11] Patent Number: 6,158,966
[45] Date of Patent: Dec. 12, 2000

[54] VOLUMETRIC CONTROL OF THE FLOW OF A FILTERING PUMP

[75] Inventors: Stephane Guespin, Fondettes; Frederic Boyer, Saint Avertin, both of France

[73] Assignee: SGS-Thompson Microelectronics S.A., Gentilly, France

[21] Appl. No.: 09/070,717

[22] Filed: Apr. 30, 1998

[30] Foreign Application Priority Data

Apr. 30, 1997 [FR] France .................................. 97 05602

[51] Int. Cl.$^7$ .................................................. F04B 49/00
[52] U.S. Cl. .................................. 417/46; 417/53; 417/63
[58] Field of Search .................................. 417/46, 53, 63, 417/386, 395

[56] References Cited

U.S. PATENT DOCUMENTS

| | | | |
|---|---|---|---|
| 3,836,355 | 9/1974 | Lindskog et al. | 75/5 BA |
| 3,974,825 | 8/1976 | Normann | 128/1 D |
| 5,174,472 | 12/1992 | Raque et al. | 222/1 |
| 5,201,636 | 4/1993 | Mikulski | 417/53 |
| 5,249,929 | 10/1993 | Miller, Jr. et al. | 417/207 |
| 5,249,932 | 10/1993 | Van Bork | 417/63 |
| 5,252,041 | 10/1993 | Schumack | 417/46 |
| 5,281,107 | 1/1994 | De Koning | 417/386 |

FOREIGN PATENT DOCUMENTS

4336823A1   5/1995   Germany .

*Primary Examiner*—Charles G. Freay
*Attorney, Agent, or Firm*—Theodore E. Galanthay; Kevin S. Costanza; Seed IP Law Group PLLC

[57] ABSTRACT

The present invention relates to a pump of resin deposition on a semiconductive wafer including a pump body divided by a membrane of definition of a resin dispensation chamber and of a control chamber and an element of filtration of the resin before its dispensation to an outlet access of the pump body. The pump includes a control system for injecting the resin under constant pressure into the control chamber and aspiring the resin from the control chamber, and a capacitive presence sensor for detecting a first position of the membrane.

25 Claims, 4 Drawing Sheets

VOLUMETRIC CONTROL OF THE FLOW OF A FILTERING PUMP

TECHNICAL FIELD

The present invention relates to a filtering pump for dispensing a given amount of a fluid, and in particular to equipment used for depositing resin on semiconductive wafers. The present invention more specifically relates to pumps used to filter and deposit a certain amount of photosensitive resin from a tank on a semiconductive wafer during a spin-on resin deposition and will be described hereafter in the context of this application.

BACKGROUND OF THE INVENTION

FIG. 1 schematically shows a conventional resin deposition pump. The pump is essentially formed of a body 1 provided with an access 2 of admission of resin r from a tank (not shown) and with an access 3 for dispensing a given amount of resin r on a wafer (not shown) rotated for a spin-on deposition. A filtering element 4 masks access 3 inside body 1 to filter the resin r when dispensed. The inlet and dispensing of resin r are controlled by means of an impervious membrane 5 delimiting, within pump body 1, a chamber 6 of resin dispensation and a chamber 7 of control by means of an adapted control fluid, for example, air a. Membrane 5, which is deformable under the action of the control fluid, is generally made of Teflon.

Chamber 7 communicates with a control system (not shown) via a duct 8 on the path of which are inserted valves 9, 10 of air aspiration or injection into chamber 7. A three-way valve can, if desired, replace valves 9 and 10. Accesses 2 and 3 meant for the passing of the resin r can be obtruded through means of respective flaps 11 and 12. Flap 11 associated with admission access 2 is a check valve preventing any sending back of resin r into the tank. Flaps 11 and 12 can be controlled individually by the pump control system, for example, electrically by means not shown, or can be provided with means of elastic return to their respective neutral positions to be controlled by the pressure differences between the inside and the outside of dispensation chamber 6 at the level of accesses 2 and 3.

A cycle of deposition of a determined amount of resin on a wafer comprises at least two steps. It is assumed that chamber 6 is initially filled with resin, that is, a pump initialization cycle consisting of filling chamber 6 from the tank has previously been performed, and that chamber 7 is empty, membrane 5 being against bottom 13 of body 1.

In a first resin dispensation step, air a is injected into chamber 7 via valve 10, valve 9 being closed. The volume of chamber 7 increases and the resulting pressure increase in chamber 6 causes the opening of flap 12 and a dispensation of resin r through access 3, flap 11 being closed during this last step. Air is injected at constant pressure for a given time. The volume of resin r deposited on the wafer thus depends on the time and on the air pressure, set by the control system.

In a second step, the positions (open/closed) of valves 9 and 10 are inverted and air a is aspired from chamber 7. This aspiration causes a volume increase of chamber 6 and the resulting pressure decrease causes the opening of flap 11 and a filling of (chamber 6 from the resin tank, flap 12 being closed. The aspiration goes on until membrane 5 is again against bottom 13.

If desired, the second step is preceded by a step of partial aspiration during which the amount of unused resin r_remaining in the pipe connecting access 3 to the area of deposition on a semiconductive wafer is aspired back into chamber 6. The opening delay of flap 11 to enable, during this intermediary step, the return of the undispensed resin r can be obtained by the respective sizing of accesses 2 and 3 and by the opening resistance of flap 11.

A disadvantage of conventional pumps is that filter 4 progressively clogs up during the dispensation cycles. This causes a decrease of the volume deposited on the wafer for a given air injection time.

Now, the volume deposited on each wafer has to be regular from one wafer to another in a same manufacturing series. The user must thus, with a conventional pump, periodically control the deposited volume to adapt the time of the dispensation cycle in the control system, to compensate the pressure increase necessary to maintain a same displacement of membrane 5 to obtain a constant volume deposition.

SUMMARY OF THE INVENTION

The principles of the present invention aim at overcoming the disadvantages of conventional pumps by providing a device of volume control of the mount of resin deposited for each dispensation cycle.

The principles of the present invention provide, in particular, a device which enables to control the duration of the dispensation cycle with the resin volume effectively dispensed.

The principles of the present invention provide, in particular, a device which can easily adapt to an existing pump, without requiring any modification of the inside of the pump.

The principles of the present invention further provide for enabling to automatically detect a malfunction of the pump.

According to an embodiment of the present invention a device is provided to control of the volume issued by a pump providing a liquid product. The device includes a membrane, of separation between a dispensation chamber and a control chamber, deformable by a pressurized fluid, and a capacitive presence sensor for detecting a first determined position of the membrane with respect to the bottom of the control chamber. The device also includes a control system for measuring, for each cycle of dispensation of the liquid product, the duration taken by the membrane to reach the first determined position, and determining from this duration an additional duration for the membrane to reach a second predetermined position corresponding to the supply of a desired volume of the liquid product.

According to another embodiment of the present invention, the additional duration is calculated by applying, to the first duration, a multiplying coefficient, determined during a calibration phase.

According to another embodiment of the present invention, the capacitive sensor is chosen for the distance between the first position that it detects and the bottom to be much lower than a displacement range of the membrane for which the pump is designed.

Another embodiment of the present invention provides a pump of resin deposition on a semiconductive wafer of the type including a pump body divided by a membrane of definition of a resin dispensation chamber and of a control chamber by means of a pressurized fluid. The pump includes an element of filtration of the resin before its dispensation to an outlet access of the pump body and a control system for, alternately, injecting the fluid under constant pressure into the control chamber and aspiring the fluid from the control chamber. The pump also includes a capacitive presence sensor for detecting a first position of the membrane corresponding to a first distance from a bottom of the control chamber.

According to another embodiment of the present invention, the control system includes a circuit for measuring, at each dispensation cycle, the time taken by the membrane to cover the first distance, and for calculating the fluid injection time required for the membrane to cover a second predetermined distance, the sum of the two distances corresponding to a desired volume of resin dispensation.

According to another embodiment of the present invention, the control system includes a circuit for indicating a malfunction of the pump.

According to another embodiment of the present invention, the control system includes a circuit for comparing the time measured and/or the time calculated with a predetermined threshold value indicative of a need for replacement of the filter.

According to another embodiment of the present invention, the control system further includes a circuit for memorizing the times measured and/or calculated, and for comparing the evolution of these times with respect to a calculated curve.

A feature of the embodiments of the present invention is the use of a pump membrane displacement sensor to control the duration of a resin dispensation cycle.

Among known displacement sensors, the embodiments of the present invention provide to use a capacitive sensor. Indeed, optic sensors are not adapted due to the non-reflectiveness of the Teflon membrane. If the membrane were reflective then an optical sensor could be used to determine its position. Inductive sensors do not operate, since neither the Teflon membrane, nor the resin r are conductive. Again, an inductive sensor could be used if the membrane or the resin were conductive. The required precision does not enable to use a mechanical sensor, unless a linear sensor which is then particularly expensive and complex is used.

Among capacitive filters, a capacitive presence detection sensor is preferred rather than a linear capacitive filter which is much more expensive. Further, a linear capacitive filter is much more bulky. This bulk must be taken down to the size of a conventional pump which is generally on the order of some ten centimeters high and from 5 to 10 cm of diameter.

The foregoing, features and advantages of the present invention will be discussed in detail in the following non-limiting description of specific embodiments in connection with the accompanying drawings.

DETAILED DESCRIPTION OF THE INVENTION

Figure 1:
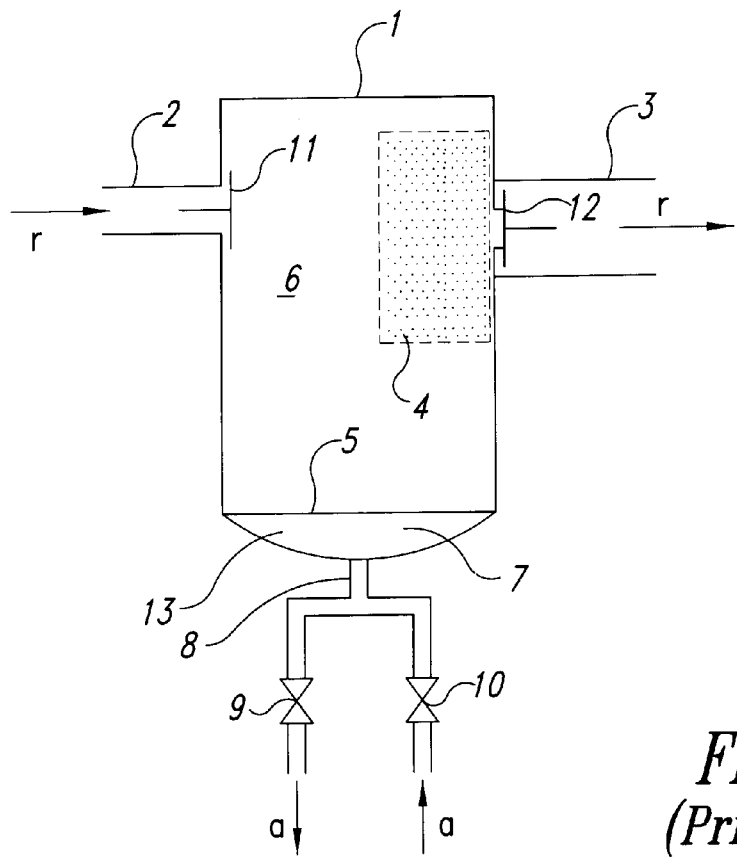
FIG. 1, previously described, is a schematic representation of a resin deposition pump according to the prior art.
Figure 2:
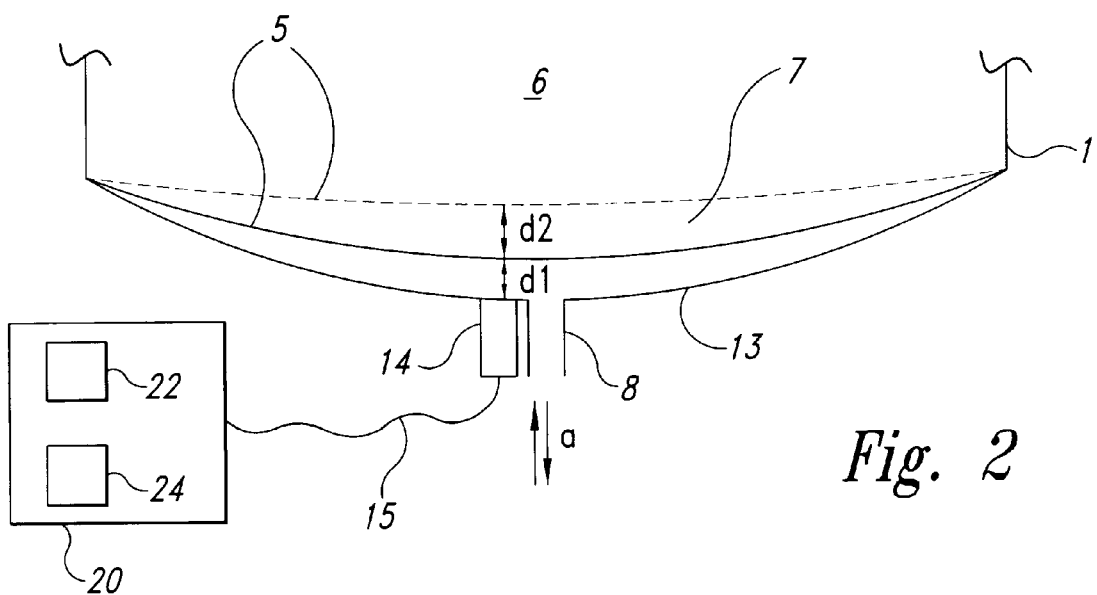
FIG. 2 shows a schematic view of a portion of a resin deposition pump equipped with a sensor according to an embodiment of the present invention.
Figure 3:
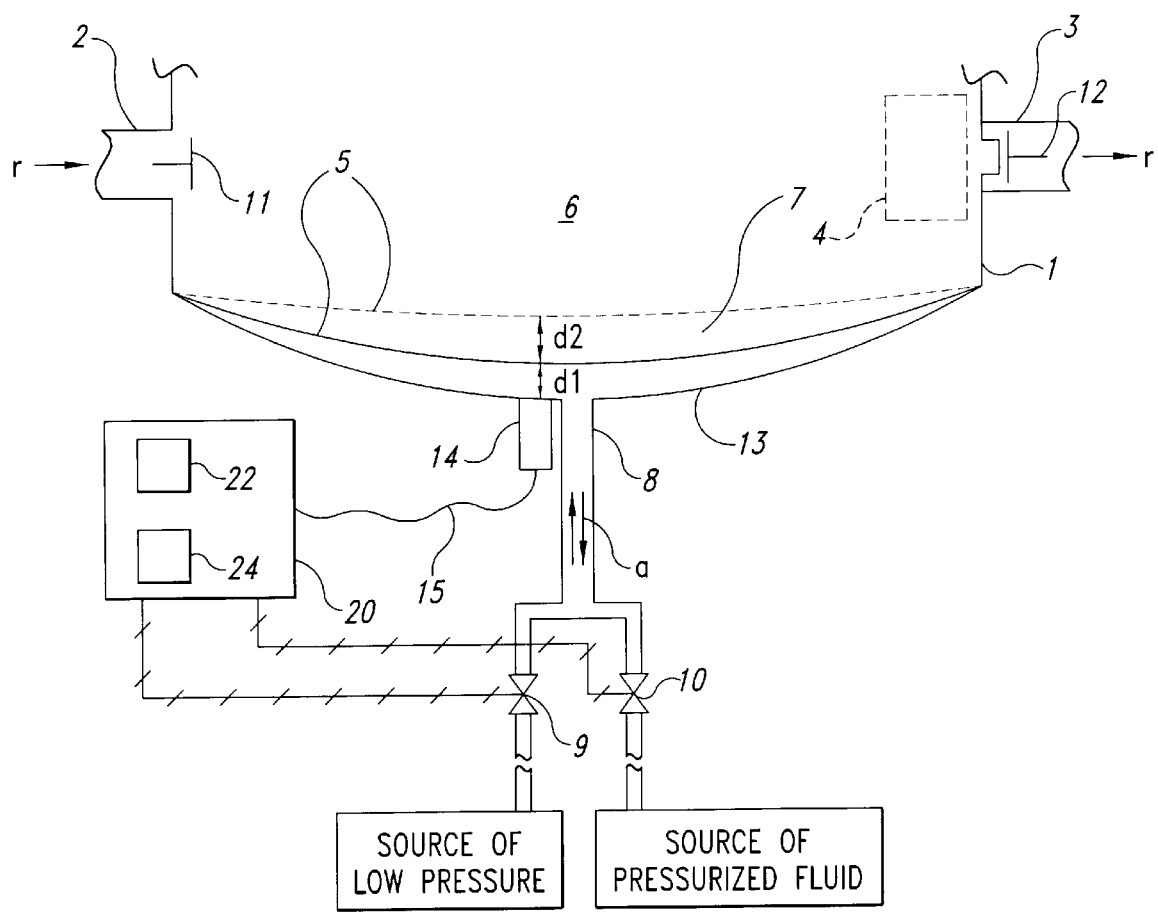
FIG. 3 shows a schematic view of a portion of a portion of a resin deposition pump equipped with a sensor according to another embodiment of the present invention.
Figure 4:
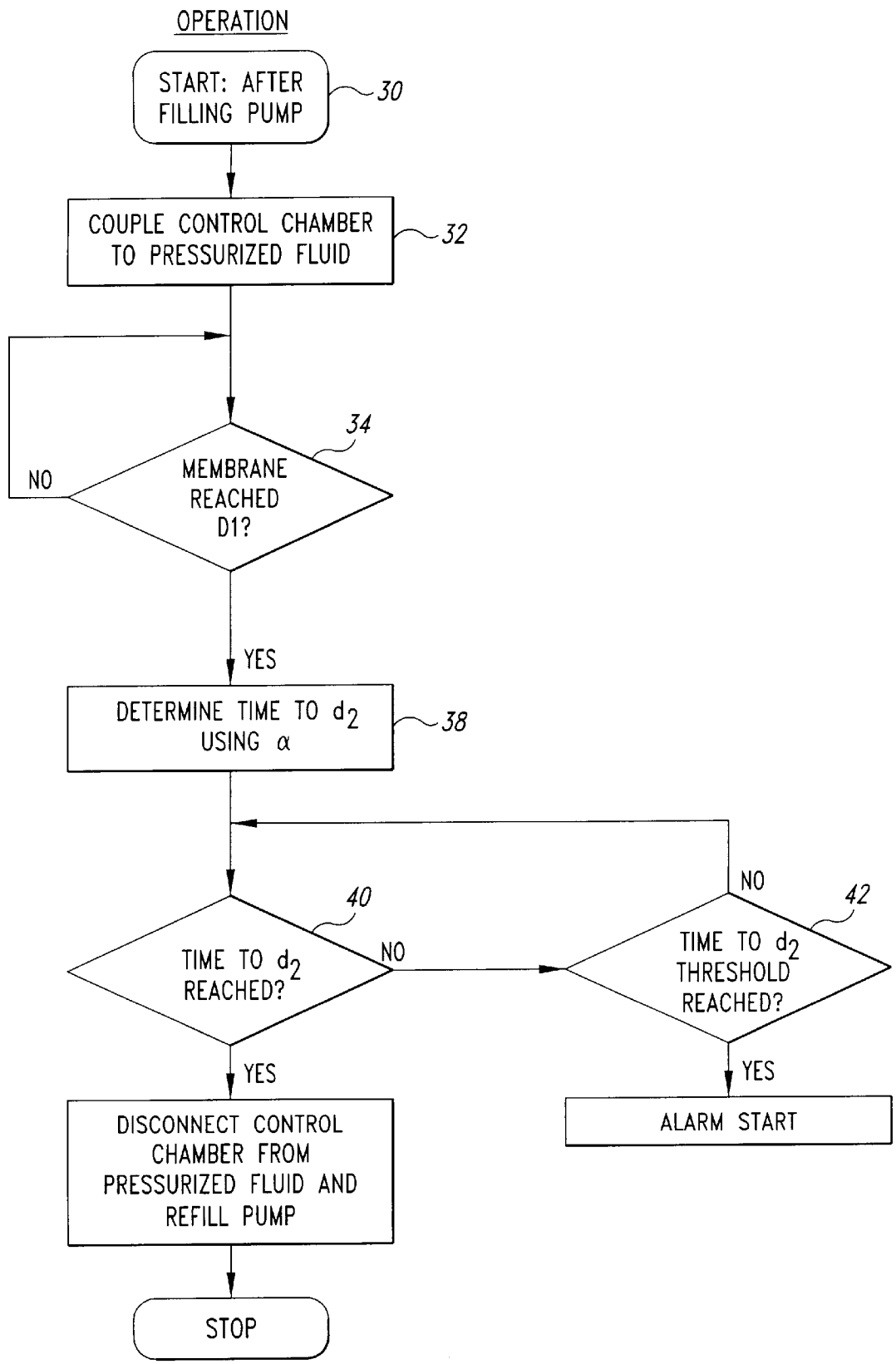
FIG. 4 is a flow chart illustrating a method for controlling the resin deposition pump of FIG. 3.
Figure 5:
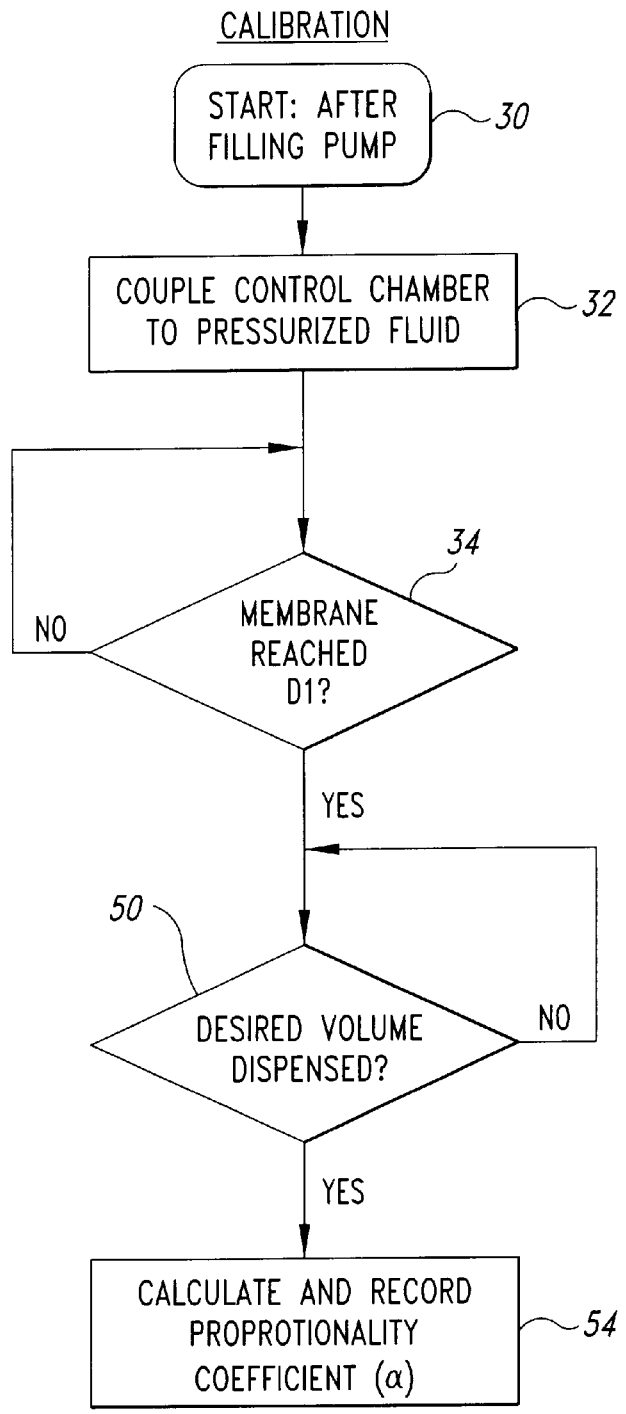
FIG. 5 is a flow chart illustrating a method of calibrating the pump of FIG. 3.

An embodiment of the present invention is shown schematically in FIG. 2. Similar elements in FIGS. 1 and 2 have been referred to by the same references in the different drawings. For clarity, only those elements necessary to the understanding of the embodiment of the present invention have been shown in the drawings and will be described hereafter.

The embodiment of the present invention is adapted to a conventional pump such as schematically shown in FIG. 1, for example, a pump sold by MILLIPORE Company under trade name WCDS.

In FIG. 2 illustrating the embodiment of the present invention, only a portion of pump body 1 including control chamber 7 and membrane 5 delimiting dispensation chamber 6 has been shown. This portion generally includes bottom 13 of pump body 1 from which pipe 8 of communication between chamber 7 and a system of aspiration and injection of air a (not shown) opens.

According to the embodiment of the present invention, a capacitive presence sensor 14 is placed in the vicinity of pipe 8 to detect a given position of membrane 5. This sensor 14 is connected, for example by a link 15, to a pump control system 20. The control system 20 may, for example, include a microprocessor 22 and a memory 24 and may be programmed to carry out the functions described below.

As previously, a pump operating cycle includes a step of dispensation of resin r and a step of filling of the chamber 6 with, if desired, a step of aspiration of the residual amount of undispensed resin r. The aspiration and filling steps are not modified by the implementation of the embodiment of the present invention.

As previously, membrane 5 is against bottom 13 after the filling step so that the volume of chamber 7 is almost null and the volume of chamber 6 is maximum.

It is assumed that sensor 14 detects the presence of membrane 5 to as far as a distance d1 from bottom 13.

At each dispensation cycle, air under constant pressure is injected through pipe 8 and the time required by the membrane 5 to cover distance d1 from bottom 13 of the pump body is measured by detecting, by means of the control system 20, the loss of detection by presence sensor 14.

Since the air injection pressure is constant, the duration during which the air injection must be pursued for membrane 5 to move by a given additional distance d2, setting the desired resin volume, can be induced from the previous duration.

As a first approximation, it can be considered that the relation between the dispensed volume and the displacement of the membrane 5 is linear, so that the time required to cover distance d2 can be induced from the time required to cover distance d1 with a simple rule of three. Indeed, the resin r is incompressible and the membrane 5 diameter (on the order of 5 to 10 cm) is very large with respect to the displacement (on the order of 1 to 3 mm) imposed thereto.

However, to refine this approximation, it will be preferred to calibrate the system when the filter 4 is new.

Thus, with a new filter 4, the duration required to dispense the desired volume of resin r is determined. During this initial dispensation, the time taken by the membrane 5 to cover distances d1 and d2 is also measured. The control system 20 then calculates a coefficient α of proportionality between the additional time required to cover distance d2 and the time of loss of detection by the presence sensor, and stores this coefficient. After this, the control system 20 assigns, for each dispensation cycle, this, coefficient to the duration measured to cover distance d1, to obtain the duration required to cover distance d2, and thus the desired volume.

The more the filter 4 is clogged, the more the time measured, required to cover distance d1, increases, and the more the calculated time, necessary to cover distance d2, accordingly increases. Thus, the more the filter 4 is clogged, the more the control system 20 automatically increases the air injection time to keep distance d1+d2 constant, and thus a constant dispensed volume.

Preferably, the control system 20 stores the different durations that it calculates and/or that it measures in the memory 24, to detect aberrations in the evolution of these durations, and thus a malfunction of the pump, for example, a breaking of filter 4 or of membrane 5. Such a detection is performed, for example, by comparing the evolution of the air injection durations (measured and/or calculated) with a calculated evolution curve in the microprocessor 22.

The air injection duration (measured and/or calculated) can also be compared with a threshold value stored to indicate a too high clogging of the filter 4 and a need to change the filter 4.

An advantage of the embodiment of the present invention is that by controlling the air injection duration with the effective displacement of the membrane 5, any need of control of the volume dispensed during the filter 4 clogging is avoided, while respecting the precise desired volume.

Another advantage of the embodiment of the present invention is that it enables to generate alarm signals to the operator in case of a too high clogging of the filter 4 or of pump malfunction, these conditions being automatically detected by the control system 20.

Another advantage of the embodiment of the present invention is that it easily adapts to an existing pump. It is enough to drill a hole into bottom 13 of the pump to place the capacitive filter, and use a control system 20 adapted to the above-described functionalities. As a specific example, a capacitive filter manufactured by German company SENSORIC can be used. The diameter of such a sensor is approximately 5 mm.

Sensor 14 is, preferably, chosen and positioned so that distance d1 is much lower than the minimum distance (d1+d2) of displacement of membrane 5 for which the pump is provided.

Of course, the present invention is likely to have various alterations, modifications, and improvements which will readily occur to those skilled in the art. In particular, the practical implementation of the control system 20 for implementing the present invention is within the abilities of those skilled in the art based on the functional indications described hereabove. Further, although the present invention has been described in the context of a specific application, it generally applies to any pump meant for supplying a determined amount of a filtered fluid, especially of a viscous fluid.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device of control of a volume issued by a pump for providing a liquid product, the pump being provided with a membrane for separation between a dispensation chamber and a control chamber, the membrane being deformable by a pressurized fluid, the device comprising:

a capacitive presence sensor for detecting a first predetermined position of the membrane with respect to a bottom of the control chamber; and a control system for measuring, for each cycle of dispensation of the liquid product, a first duration taken by the membrane to reach the first predetermined position, and determining from this first duration an additional duration for the membrane to reach a second predetermined position corresponding to a supply of a desired volume of the liquid product.

2. The control device of claim 1 wherein the additional duration is calculated by applying, to the first duration, a multiplying coefficient, determined during a calibration phase.

3. The control device of claim 1 wherein the distance between the first predetermined position and the bottom is less than a displacement range of the membrane.

4. A pump for resin deposition on a semiconductive wafer comprising:

a pump body having a membrane dividing a resin dispensation chamber and a control chamber, the control chamber being in fluid communication with a source of pressurized fluid;

an element for filtration of the resin;

a control system for, alternately, injecting the pressurized fluid under constant pressure into the control chamber and aspiring the pressurized fluid from the control chamber; and a capacitive presence sensor for detecting a first position of the membrane corresponding to a first distance from a bottom of the control chamber.

5. The pump of claim 4 wherein the control system includes a circuit for measuring, at each dispensation cycle, a time taken by the membrane to cover the first distance, and for calculating a fluid injection time required for the membrane to cover a second predetermined distance, the sum of the two distances corresponding to a desired volume of resin dispensation.

6. The pump of claim 5 wherein the control system includes circuitry for indicating a malfunction of the pump.

7. The pump of claim 6 wherein the control system includes circuitry for comparing at least one of the time measured and the fluid injection time calculated with a predetermined threshold value indicative of a need for replacement of the filter.

8. The pump of claim 7 wherein the control system further includes circuitry for memorizing at least one of the times measured and the time calculate d, and for comparing the evolution of these times with respect to a calculated curve.

9. A pump for dispensing a fluid product in discrete amounts comprising:

a body having a wall and a bottom defining an interior chamber of the body;

a flexible membrane inside the interior chamber of the body having edges fixed to the body, the membrane dividing the interior chamber of the body into a pump chamber and a control chamber, the control chamber being defined between the bottom and the membrane;

an inlet formed in the wall in fluid communication with the pump chamber for providing the fluid product to the pump chamber;

an outlet formed in the wall in fluid communication with the pump chamber for dispensing the fluid product from the pump chamber;

a duct formed in the bottom in fluid communication between the control chamber and a first valve, the first valve being structured to provide a control fluid to the control chamber through the duct;

a sensor fixed to the body, the sensor being structured to determine a position of the membrane; and a control circuit having an input coupled to the sensor to receive data from the sensor and an output coupled to the first valve, the control circuit being structured to control the first valve to provide the control fluid to the control chamber in response to the data from the sensor to control a position of the membrane.

10. The pump of claim 9 wherein the sensor comprises a capacitive sensor fixed to the bottom.

11. The pump of claim 10 wherein the capacitive sensor comprises a capacitive presence detection sensor fixed to the bottom proximate to the duct, the capacitive presence, detection sensor being structured to sense a distance between the membrane and the bottom when the membrane is separated from the bottom by more than a first predetermined distance.

12. The pump of claim 9, further comprising:
a second valve in the inlet structured to permit a flow of the fluid product into the pump chamber through the inlet;
a filter in the pump chamber proximate to the outlet, the filter being structured to filter the fluid product passing to the outlet; and
a third valve in the outlet structured to permit a flow of the fluid product from the pump chamber through the outlet.

13. The pump of claim 9 wherein the control circuit includes a microprocessor circuit and a memory circuit and is structured to control the first valve to alternately provide a pressurized control fluid to the control chamber and to vent the pressurized control fluid from the control chamber to move the membrane to alternately force the fluid product from the pump chamber through the outlet and draw the fluid product into the pump chamber.

14. The pump of claim 13 wherein the first valve comprises an input valve coupled between a source of the pressurized control fluid and the duct and an output valve coupled between a source of low pressure control fluid and the duct, the input valve and the output valve being controlled by the control circuit.

15. The pump of claim 9 wherein the flexible membrane is at least partially reflective and the sensor comprises an optical sensor.

16. The pump of claim 9 wherein the flexible membrane is at least partially conductive and the sensor comprises an inductive sensor.

17. The pump of claim 9 wherein the sensor comprises a linear mechanical sensor.

18. The pump of claim 9 wherein the edges of the membrane are sealed to the wall of the body, the membrane being impervious to fluid flow so that the control fluid does not pass to the pump chamber and the fluid product does not pass to the control chamber.

19. A method for controlling a pump to discharge a liquid in discrete amounts, the pump having a first chamber and a second chamber divided by a deformable membrane inside a pump shell, the first chamber having an inlet in the pump shell for receiving the liquid and an outlet in the pump shell for discharging the liquid, the second chamber being coupled to a valve through a bottom of the pump shell for receiving a control fluid through the valve, the method comprising:
coupling the second chamber to a source of reduced pressure control fluid to draw the membrane into contact with the bottom of the pump shell and draw the liquid through the inlet into the first chamber;
coupling the second chamber to a source of pressurized control fluid to move the membrane to a first predetermined distance from the bottom of the pump shell to discharge the liquid from the first chamber through the outlet;
detecting a first time period during which the membrane is moved from the bottom of the pump shell to the first predetermined distance;
calculating a second time period required to move the membrane to a second predetermined distance from the first predetermined distance based on the first time period;
terminating the coupling between the second chamber and the pressured control fluid at an end of the second time period to stop the movement of the membrane and the discharge of the liquid; and
coupling the second chamber to the source of reduced pressure control fluid to draw the membrane into contact with the bottom of the pump shell.

20. The method of claim 19 wherein the step of detecting a first time period comprises:
detecting an initial time when the second chamber is coupled to the source of pressurized control fluid;
sensing a position of the membrane when the membrane has moved to the first predetermined distance; and
calculating a first time period between the initial time and a time when the membrane has moved to the first predetermined distance.

21. The method of claim 20 wherein the step of calculating a second time period comprises:
determining an amount of liquid to be discharged;
calculating a second predetermined distance to move the membrane to from the first predetermined distance to discharge the determined amount of liquid; and
calculating a second time period in which to couple the source of pressurized control fluid to the second chamber to move the membrane to the second predetermined distance by multiplying the first time period by a coefficient.

22. The method of claim 21, further comprising:
locating a new filter proximate to the outlet in the pump shell;
coupling the second chamber to a source of reduced pressure control fluid to draw the membrane into contact with the bottom of the pump shell;
coupling the second chamber to the source of pressurized control fluid to move the membrane to the first predetermined distance;
sensing a position of the membrane with a capacitive sensor;
detecting a first calibration time period during which the membrane moves from the bottom of the pump shell to the first predetermined distance based on the position of the membrane sensed by the capacitive sensor;
detecting a second calibration time period during which the membrane moves from the first predetermined distance to the second predetermined distance based on the position of the membrane sensed by the capacitive sensor;
calculating the coefficient as a ratio of the second calibration time period and the first calibration time period.

23. The method of claim 19 wherein the step of detecting a first time period comprises sensing a position of the membrane with a capacitive presence detection sensor when the membrane is at least the first predetermined distance from the bottom of the pump shell.

24. The method of claim 19, further comprising:

storing the first time period and the second time period in a memory for each discharge of liquid from the first chamber; and detecting a malfunction in the pump when a change in the first and second time periods over a series of discharges deviates from a preselected pattern.

25. The method of claim 19, further comprising detecting an excessively clogged filter proximate to the outlet in the pump shell when the first time period, or the second time period, or both exceeds a threshold value.

* * * * *